Dec. 5, 1967                     E. O. STONE                     3,356,899
                                DISPLAY DEVICE
Filed April 2, 1965                                          3 Sheets-Sheet 1

INVENTOR
ELMER O. STONE
BY
*Robert E. Strausser*
ATTORNEY

Dec. 5, 1967  E. O. STONE  3,356,899
DISPLAY DEVICE
Filed April 2, 1965 3 Sheets-Sheet 2
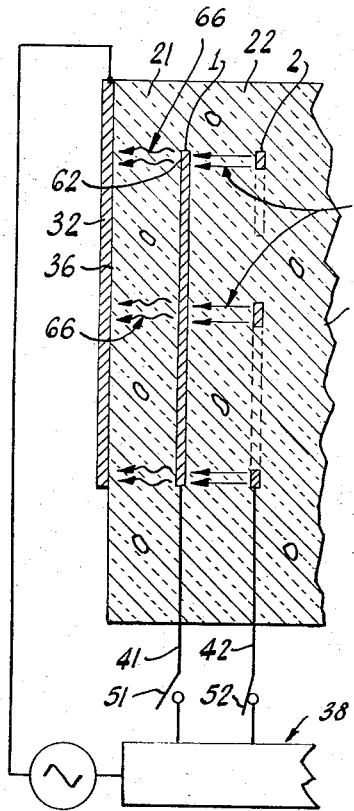
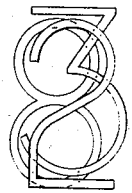
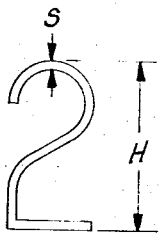
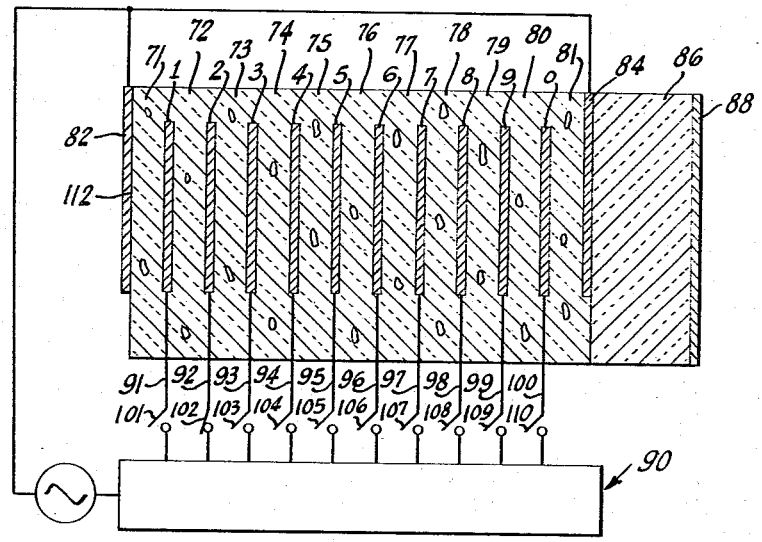
INVENTOR
ELMER O. STONE
BY
ATTORNEY Dec. 5, 1967   E. O. STONE   3,356,899
DISPLAY DEVICE
Filed April 2, 1965   3 Sheets-Sheet 3

INVENTOR
ELMER O. STONE
BY
Robert E. Strausser
ATTORNEY

United States Patent Office 3,356,899
Patented Dec. 5, 1967

3,356,899
DISPLAY DEVICE
Elmer O. Stone, Seneca Falls, N.Y., assignor to Sylvania Electric Products Inc., a corporation of Delaware
Filed Apr. 2, 1965, Ser. No. 445,008
5 Claims. (Cl. 315—320)

This invention relates generally to display devices and more particularly to electroluminescent display devices of the type used as numeric readout indicators.

Display devices of various kinds useful as numeric or alpha-numeric readout indicators are known in the art. They are employed in many different types of equipment such as counting devices, data processing equipment, electronic testing apparatus, digital clocks, etc.

A readout device suitable for operation in any of the instances noted above should possess certain qualifications among which are the following: compactness, ruggedness, and good viewability over a wide viewing angle. It should be capable of functioning directly from an input signal without having to resort to switching or translating devices. It should possess a speed of operation consistent with the other operations of the equipment in which it is used. It should be of the type that will not give an inaccurate reading because of the failure of one part, and it should not be subject to catastrophic failure. It should be relatively inexpensive to manufacture, operate, and maintain and, preferably, should not be dependent upon a particular kind of atmosphere for operation. Also, while not among the most important qualifications, the digits presented by the device should be aesthetically pleasing and easy to read.

The major display devices in use today include the following types: segmented electroluminescent devices; cold-cathode, glow discharge devices; rear screen optical projectors; mechanical devices; incandescent segmented displays; and cathode ray tubes.

An examination of these presently used display devices shows that all of them are wanting in one or more of the above-mentioned qualifications.

The segmented electroluminescent device, for example, must use a switching matrix to convert decimal input signals to the proper output signals and feed them to the necessary segments. Also, the nature of a segmented display provides numerals that are rectangular in appearance and are, for some people, difficult to read.

The cold cathode, gas-filled, glow discharge devices utilize stacked numerals in a glass envelope which is fragile and rather bulky. It is subject to catastrophic failure and, of course, the electrodes must be surrounded by a special atmosphere. In addition, it has a relatively narrow viewing angle because of parallax which comes from stacking electrodes.

The rear screen optical projection system is bulky, difficult to maintain, and among the most expensive of the displays.

The chief fault of mechanical counters is that they are relatively slow, because of inertia and friction, when compared with wholly electrical devices.

Cathode ray tubes are bulky, require a good deal of associated equipment, are expensive, and require an evacuated envelope.

Segmented displays utilizing incandescent lamps are subject to the same limitations as the EL displays and, in addition, are subject to false readings if only one lamp should fail. For instance, if the middle "bar" or lamp of the display should unknowingly fail, an "8" would appear on the display as "0." Such mistaken readings could, in many instances, prove to be very costly.

It is, therefore, an object of this invention to improve numeric readout devices.

It is another object of the invention to improve the readability of electroluminescent displays.

Still another object of the invention is to enhance the ruggedness of such devices.

Yet another object of the invention is the provision of a display device that utilizes stacked symbols but does not suffer from parallax.

Other objects of the invention are to provide numeric readout displays that are compact, simple, and inexpensive to manufacture, always give a correct reading, are fast in operation, are not subject to catastrophic failure, and need no special atmosphere for operation.

The above objects are carried out by the provision of a device for displaying illuminable, intelligence conveying, stacked symbols in a common plane. Briefly, this is accomplished, in one aspect of the invention, in a device comprised of N substantially transparent, stacked electrodes, each formed to provide a symbol. N layers of an electroluminescent phosphor embedded dielectric material are alternated in serial array with the electrode symbols and a common transparent electrode is provided on the outermost dielectric layer. This construction provides an individual electroluminescent lamp between the common electrode and each of the symbol electrodes. Means are provided for selectively energizing the lamps one at a time.

This device provides many distinct advantages over the prior art and possesses all of the necessary qualifications noted above. Because it is a solid-state device, compactness and ruggedness are inherent qualities. In spite of the fact that it is a stacked display, the nature of the electroluminescent phosphor is such that all symbols are displayed in a common plane making the device a planar one with an inherent wide angle of viewability with no distortion from parallax. Because each intelligence conveying electrode exists as a complete antity, no switching matrix is needed if the input signal is in decimal form. (All decimal numeric readout displays need some form of translation or switching if the input signal is in the form of binary coded decimal information.)

It is wholly electronic in operation and, therefore, its speed of operation will be consistent with the equipment in which it is employed. It is a completely integrated unit, i.e., its symbols are not built up from pieces as in segmented displays and, therefore, it cannot provide false readings because of the failure of one part. Because it utilizes electroluminescence, it will not fail catastrophically since electroluminescent devices expire gradually with a decreasing light output as they age.

The device would also be relatively simple and economical to make since standard graphic arts techniques could apply the intelligence conveying electrodes and standard coating practices could provide the electroluminescent layers. The device operates well in normal atmosphere and since each intelligence conveying electrode is a separate entity, a wide range of aesthetically pleasing configurations is available.

For a better understanding of the present invention, together with other and further objects, advantages, and capabilities thereof, reference is made to the following disclosure and appended claims in connection with the accompanying drawings in which:

FIG. 4 is a diagrammatic sectional view taken along the line 4—4 of FIG. 3 showing the manner in which the light output is derived;

FIG. 5 is an elevational view showing one manner in which the electrodes may be stacked to reduce shadowing effects;

FIG. 6 is an elevational view of a typical symbol which may be used with the device;

FIG. 7 is a side elevational sectional view of a device illustrating another embodiment of the invention;

Figure 1:
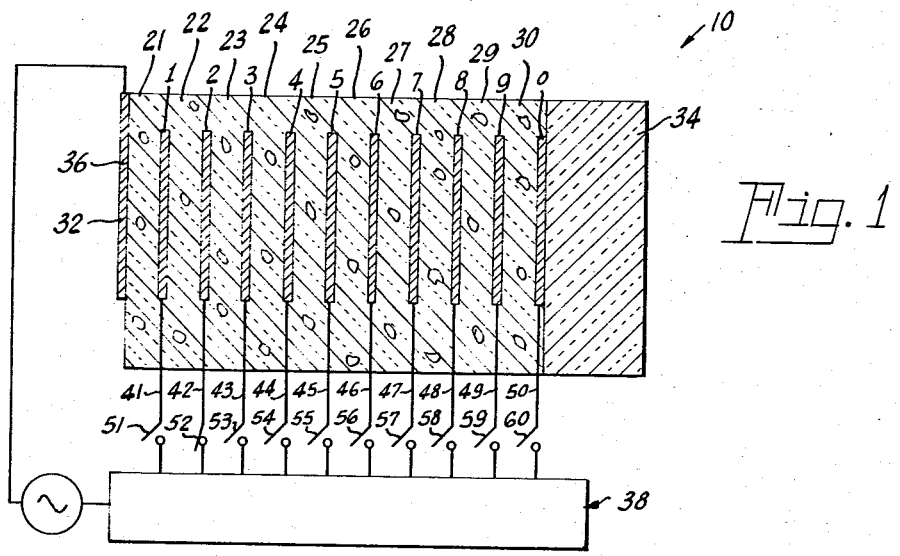
FIG. 1 is a side elevational sectional view of a device illustrating one embodiment of the invention.

Referring now to the drawings with greater particularity, in FIG. 1 there is illustrated a device 10 for displaying illuminable, intelligence conveying, stacked symbols in a common plane. Device 10 is comprised of a given number of substantially transparent, stacked electrodes, each formed to provide an intelligence conveying symbol. In this instance these symbols shall correspond to the arabic digits 1, 2, 3, 4, 5, 6, 7, 8, 9, and 0; and they are so numbered. It is to be noted that this is by way of example only since symbols other than those mentioned are operable with this device, e.g., letters of the alphabet, and the number of electrodes may be more or less than ten.

Cooperating with the symbolically formed electrodes are an equivalent number of layers of an electroluminescent phosphor embedded dielectric material. These layers are designated 21, 22, 23, 24, 25, 26, 27, 28, 29, and 30, respectively. The layers and symbolically formed electrodes alternate with one another in a serial array as shown in FIG. 1. The dielectric material may be ceramic or plastic, both of which are currently used in electroluminescent devices; and the phosphor may be any one of a number of known varieties which luminesce when placed in an electric field. A transparent common electrode 32 is provided on the outermost layer, 21 in this instance, and the entire array of layers and electrodes may be mounted upon an insulating substrate 34 of some suitable material such as glass.

This construction provides a plurality of individual electroluminescent lamps formed between the common electrode 32 and each of the symbolically formed electrodes. When an electric field is placed across the common electrode 32 and one of the symbolically formed electrodes, "2" for example, the digit is illuminated and becomes visible on the common plane surface 36. By switching the electric field to another symbolically formed electrode, "5" for example, that digit will be displayed.

Because the light output of an electroluminescent device is dependent upon many factors, including primarily the thickness of the dielectric, the strength of the electric field applied and the frequency of the applied field, it follows that if the frequency and strength of the applied field remain constant, the light output will decrease as the thickness increases.

Therefore, if the strength of the electric field applied to the "5" is the same as that applied to the "2," the "5" will not emit as much light as the "2" because of the increase thickness of the dielectric between the "5" and the common electrode. To maintain constant light output then, it will be necessary to increase the strength of the electric field progressively for each electrode as the distance between symbolic electrodes and the common electrode increases.

Figure 2:
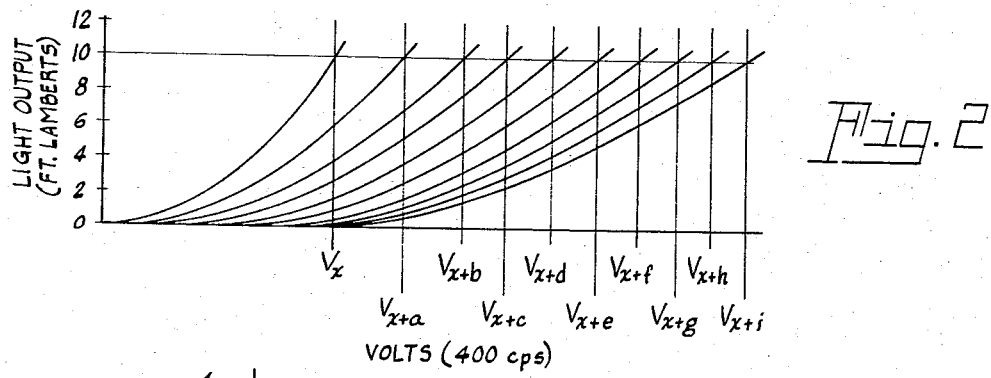
FIG. 2 is a graph of light output versus voltage for the device of FIG. 1.

This is shown graphically in FIG. 2 where it will be seen that if $Vx$ volts are necessary to provide 10 ft. lamberts of light output for the "1" digit, then $Vx+a$ volts will be needed to provide the same light output for the "2" digit.

The graph shown in FIG. 2 represents typical voltage increases, and it is to be noted that the incremental changes in voltage would not necessarily be the same for all types of displays since they would be subject to variation due to the type of dielectric, type of phosphor, particle size of the phosphor, frequency of the applied field, manufacturing techniques, etc.

In FIG. 1, voltage supply means 38 is shown as providing the proper voltage between the common electrode 32 and each of the symbolically formed electrodes, and it may be any type of available device for providing diffeernt voltages such as a transformer with a plurality of taps. Connectors 41–50 connect the symbolically formed electrodes 1, 2 . . . 0 to voltage supply means 38 through switches 51–60. The switches may be actuated by means originating with the equipment with which the display is being utilized.

To prevent illumination from emanating from those parts of the connectors which lie within the phosphor embedded dielectric, common electrode 32 may be formed so that it covers only the area necessary to present the digits.

Figure 3:
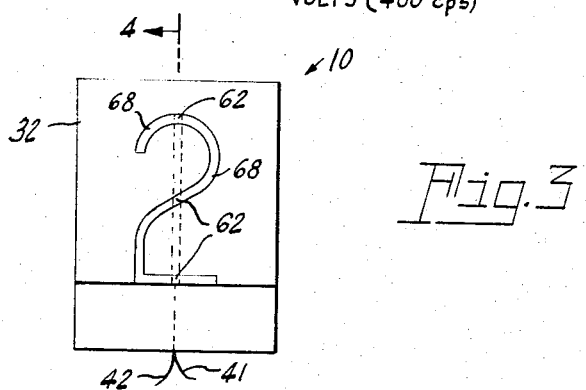
FIG. 3 is a front elevational view of the device with a symbol illuminated.

In operation the device performs as follows:

An energizing signal originating in associated equipment (not shown) actuates one of the switches, for example, 52 (see FIG. 1). This action supplies an electric field of $Vx+a$ volts between common electrode 32 and the "2" digit and causes the numeral two to appear on common plane surface 36 as shown in FIG. 3.

When a different energizing signal is sent from the associated equipment, the switch 52 will open and another switch, corresponding to the new energizing signal, will close and the digit associated therewith will appear on common plane surface 36.

The nonenergized digits lying between the common electrode and an energized or illuminated digit will have one of two different effects upon the illuminated digit depending on the potential at which they are maintained. If they are maintained electrically floating, they will luminesce to some degree by virtue of the voltage being impressed around them. Obviously, this effect can become very distracting under some conditions. On the other hand, these nonilluminated digit electrodes could be maintained at ground potential and would then cause an effect known as shadowing. This shadowing is caused by the fact that no light will be produced between the common electrode and a nonilluminated electrode (maintained at ground potential) at those points where the nonilluminated electrode crosses or shadows an illuminated one. This is shown in FIG. 3 where the numeral "two" is displayed and is shadowed by the "one" which lies between it and the common electrode 32. No light will be produced in layer 21 at those areas indicated as 62 where the "one" shadows the "two."

If the digit electrodes are formed from an opaque material such as a metallic coating or a metal stamping, the areas 62 will be completely nonilluminated. This condition may be mitigated to some extent, however, by making the electrodes substantially transparent, for example, by forming them from a coating of stannous chloride which is electrically conductive and transparent. While making the electrodes transparent will not cause light to be produced in layer 21 in the shadow areas 62 between the "one" and the common electrode 32, it will allow light produced in layer 22 between the "two" and the "one" to be transmitted through the shadow area 62 and layer 21 where it will appear on common plane surface 36.

This is shown more clearly in FIG. 4 in which the straight arrows 64 in layer 22 represent produced or generated light and the wavy arrows 66 in layer 21 represent transmitted light. It will be understood that where the "one" does not shadow the "two," as at areas 68 in FIG. 3, light will be produced in both layers 22 and 21. It shall be obvious also that for any light to be transmitted the dielectric material must have a certain degree of translucency. Also, to further increase the amount of light transmitted the index of refraction of the transparent digit electrode should match that of the dielectric as nearly as possible.

Shadowing may also be reduced by staggering the digits with respect to one another and by varying the size of the individual digits as is shown with the "2," "3," and "8" in FIG. 5. This may be done to a small degree without causing a noticeable change in the digits as presented.

A still further reduction in shadowing may be obtained by keeping the stroke "S," i.e., line width, of the digits small relative to the height "H" as shown in FIG. 6. A stroke equal to or less than 1/25 the height provides acceptable results and strokes as wide as 1/10 the height may also be used in some instances.

In FIG. 7 is illustrated another embodiment of the invention in which the voltages supplied may be less than those in device 10 for the same amount of light output. Device 70 is shown as having substantially transparent, symbolically formed electrodes 1, 2 . . . 0 and electroluminescent phosphor embedded layers 71–81. In this instance there is one more layer than there are symbolically formed electrodes. The layers and symbolically formed electrodes alternate with one another in serial array as shown in FIG. 7. First and second electrically connected common electrodes, 82, 84, respectively, are provided on the outermost layers, 71, 81 in this instance; and the entire array of layers and electrodes may be mounted upon an insulating substrate 86 of some suitable material such as glass. The substrate may have on the outside surface thereof a light reflective layer 88 as of silver or aluminum.

Voltage supply means 90 is provided to supply the proper voltage between the common electrodes and each of the symbolic electrodes.

Connectors 91–100 connect the symbolically formed electrodes to voltage supply means 90 through switches 101–110.

The above construction provides pairs of electroluminescent lamps for each symbol, one lamp formed between a given symbol and common electrode 82 and the other lamp formed between the symbol and electrode 84. Because, as was mentioned above, a certain translucency exists in phosphor embedded dielectric material, the light output from the two lamps will add together thereby permitting lower voltage differences to be applied to the digits in device 70 to get the same light output as device 10.

Figure 8:
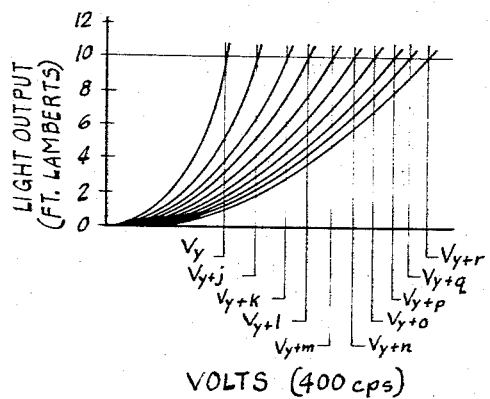
FIG. 8 is a graph of light output versus voltage for the device of FIG. 7.

This is illustrated graphically in FIG. 8 and wherein $Vy$ is less than $Vx$ of FIG. 2 and $Vy+j$ is less than $Vx+a$, etc.

Figure 9:
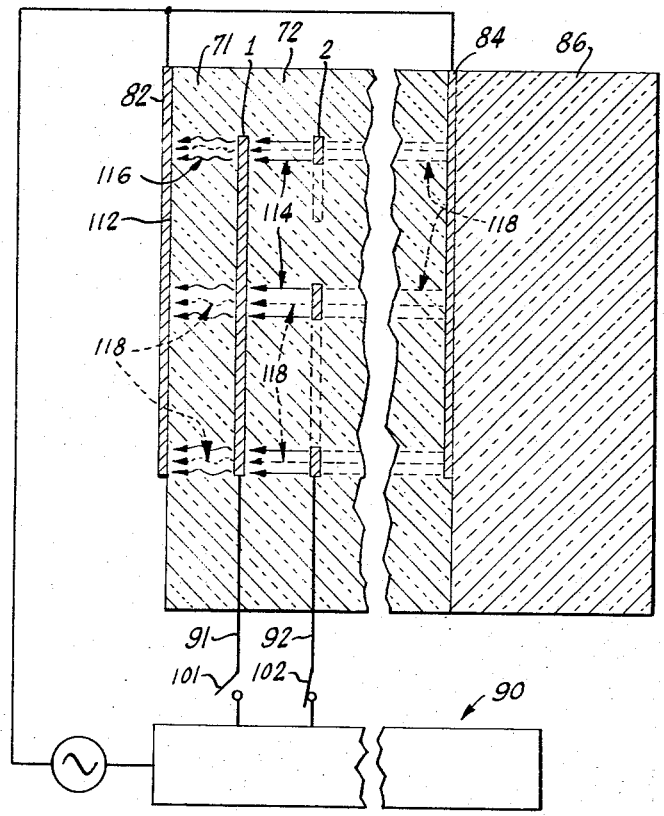
FIG. 9 is a diagrammatic view of the device of FIG. 7 showing the manner in which light output is derived.

A clearer understanding of the operation can be had by referring to FIG. 9. When an energizing signal from associated equipment (not shown) actuates a switch, 102 for example, an electric field of $Vy+j$ volts will be supplied between the "2" digit and the common electrodes 82, 84. This action causes the numeral "two" to appear on common plane surface 112. The total light output will be derived from the light emanating from the lamp produced between common electrode 82 and the "2" electrode and from the light emanating from the lamp produced between the "2" electrode and common electrode 84. Because of this addition of light from a second lamp, the voltage requirements for a given light output are less with device 70 than device 10.

The image of the numeral "two" that appears on common plane surface 112 may be considered to be formed of light from three different sources, i.e., light which is produced within layers 72 and 71 as explained above in regard to device 10, and which is shown as straight line arrows 114; light which is produced in layer 72 and transmitted through layer 71 (because of shadowing) indicated by wavy lines 116; and light which is produced in the second lamp (layers 73–78) and transmitted through layers 72 and 71 indicated by dotted lines 118.

If the reflective coating 88 is utilized, then there will be still another source of light, i.e., light which is transmitted through the glass substrate, hits the reflective layer and is retransmitted back through the entire device.

It will be noted that, except when the middle symbolic electrode is being illuminated, the light output from the two lamps will not be equal because the same voltage will be applied across two different thicknesses of phosphor embedded dielectric; however, for a given voltage the total light generated will be the same for all digits. For example, when the "1" is illuminated, the light output from the lamp formed between the "1" and common electrode 82 will be much greater than that formed between the "1" and common electrode 84. Conversely, when the "0" is illuminated, the light output from the lamp formed between it and the common electrode 84 will be greater than that formed between it and common electrode 82. However, the total amount of light generated for the "1" and the "0" will be the same for the same voltage. The reason that a greater voltage must be applied to the "0" to get the same amount of emitted light as from the "1" lies in the fact that the phosphor embedded dielectric layers are not absolutely transparent and some light is lost in being transmitted through the greater thicknesses of phosphor layers. From this it will be seen that the more nearly transparent the phosphor dielectric is to the particular wave length of light emitted by the phosphor the more light there will be emitted; therefore smaller voltage differences will be needed.

While there have been shown and described what are at present considered the preferred embodiments of the invention, it will be obvious to those skilled in the art that various changes and modifications may be made therein without departing from the scope of the invention as defined by the appended claims.

What is claimed is:

1. A device for displaying illuminable, intelligence conveying, stacked symbols in a common plane, said device comprising: N substantially transparent, stacked electrodes each formed to provide one of said symbols and N layers of an electroluminescent phosphor embedded dielectric material alternating in serial array with said symbolically formed electrodes and a transparent common electrode formed on the outermost one of said electroluminescent layers whereby individual electroluminescent lamps are formed between said common electrode and each of said symbolically formed electrodes and means for selectively energizing said lamps one at a time.

2. A device for displaying illuminable, intelligence conveying, stacked symbols in a common plane, said dedive comprising: N substantially transparent, stacked electrodes each formed to provide one of said symbols and N layers of an electroluminescent phosphor embedded dielectric material alternating in serial array with said symbolically formed electrodes and a transparent common electrode formed on the outermost one of said electroluminescent layers whereby individual electroluminescent lamps are formed between said common electrode and each of said symbolically formed electrodes; said lamps, when energized, taking the form of the symbolically formed electrode associated therewith and means for selectively energizing said lamps one at a time, said energizing means comprising means for providing substantially equal light output from each lamp.

3. A device for displaying illuminable, intelligence conveying, stacked symbols in a common plane, said device comprising: N substantially transparent, stacked electrodes each formed to provide one of said symbols and $N+1$ layers of an electroluminescent phosphor embedded dielectric material alternating in serial array with said symbolically formed electrodes; first and second electrically connected common electrodes, at least one of which is transparent, positioned one on either side of said serial array whereby individual pairs of electroluminescent lamps are formed between said common electrodes and said symbolically formed electrodes and means for selectively energizing said lamps one at a time, said energizing means comprising means for providing substantially equal light output from each pair of lamps.

4. A device for displaying illuminable, intelligence conveying, longitudinally stacked symbols in a common plane, said device comprising: N substantially transparent longitudinally stacked electrodes each formed to provide one of said symbols, said symbolically formed electrodes having a given height and a given stroke, said stroke being relatively small compared to said height, and N layers of an electroluminescent phosphor embedded dielectric material alternating in serial array with said symbolically formed electrodes and a transparent common electrode formed on the outermost one of said electroluminescent layers whereby individual electroluminescent lamps are formed between said common electrode and each of said symbolically formed electrodes and means for selectively energizing said lamps one at a time.

5. A device for displaying illuminable, intelligence conveying, stacked symbols in a common plane, said device comprising: N substantially transparent, longitudinally stacked electrodes each formed to provide one of said symbols and said symbolically formed electrodes being arrayed to provide minimal shadowing effects; N layers of an electroluminescent phosphor embedded dielectric material alternating in serial array with said symbolically formed electrodes and a transparent common electrode formed on the outermost one of said layers whereby individual electroluminescent lamps are formed between said common electrode and each of said symbolically formed electrodes; and means for selectively energizing said lamps one at a time.

References Cited

UNITED STATES PATENTS

| | | | |
|---|---|---|---|
| 2,867,739 | 1/1959 | Michlin | 313—108 |
| 2,953,776 | 9/1960 | Blutman et al. | 313—108 |
| 3,244,923 | 4/1966 | Milliken | 313—109.5 |
| 3,299,307 | 1/1967 | Inoue | 313—108 |

JAMES W. LAWRENCE, *Primary Examiner.*

R. JUDD, *Assistant Examiner.*